(12) United States Patent
Grillon et al.

(10) Patent No.: US 11,788,591 B2
(45) Date of Patent: Oct. 17, 2023

(54) BRAKING DEVICE

(71) Applicant: POCLAIN HYDRAULICS INDUSTRIE, Verberie (FR)

(72) Inventors: Gilles Grillon, Verberie (FR); Loic Bonnard, Verberie (FR); Dominique Costaz, Verberie (FR); Julien Engrand, Verberie (FR); Philippe Telega, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 544 days.

(21) Appl. No.: 17/051,819

(22) PCT Filed: Apr. 29, 2019

(86) PCT No.: PCT/FR2019/050997
§ 371 (c)(1),
(2) Date: Oct. 30, 2020

(87) PCT Pub. No.: WO2019/211554
PCT Pub. Date: Nov. 7, 2019

(65) Prior Publication Data
US 2021/0123488 A1 Apr. 29, 2021

(30) Foreign Application Priority Data
May 2, 2018 (FR) ....................... 1800401

(51) Int. Cl.
*F16D 55/38* (2006.01)
*F16D 65/18* (2006.01)
(Continued)

(52) U.S. Cl.
CPC .............. *F16D 55/38* (2013.01); *F15B 15/00* (2013.01); *F16D 65/186* (2013.01);
(Continued)

(58) Field of Classification Search
CPC .......... F16D 55/38; F16D 55/40; F16D 55/41; F16D 65/186
See application file for complete search history.

(56) References Cited

U.S. PATENT DOCUMENTS 4,667,527 A 5/1987 Ehrlinger et al.
5,050,710 A * 9/1991 Bargfrede ............... F16D 55/38
188/71.6
(Continued)

FOREIGN PATENT DOCUMENTS

| FR | 2529978 A1 | 1/1984 |
| FR | 2958986 A1 | 10/2011 |
| GB | 2117465 A | 10/1983 |

*Primary Examiner* — Michael Leslie
(74) *Attorney, Agent, or Firm* — THE WEBB LAW FIRM

(57) ABSTRACT

A braking device may include a brake casing rotatably assembled with respect to a shaft along an axis of rotation, first braking elements and second braking elements, forming a stack, an elastic return element configured to exert an application force on the first and second braking elements, and a brake release actuator, adapted to bias the elastic return element along a direction opposing the application direction. The braking device a may include a diffusion wedge and a pressure wedge positioned respectively to bear against the stack and against the elastic return element. The diffusion wedge and the pressure wedge may have contact surfaces defining an annular linear contact about the axis of rotation.

20 Claims, 3 Drawing Sheets

(51) Int. Cl.
    *F16D 55/40* (2006.01)
    *F15B 15/00* (2006.01)
    *B60K 7/00* (2006.01)
    *B60T 13/58* (2006.01)
    *F16D 121/04* (2012.01)
    *F16D 121/12* (2012.01)

(52) U.S. Cl.
    CPC .......... *B60K 7/0015* (2013.01); *B60T 13/58* (2013.01); *F16D 55/40* (2013.01); *F16D 2121/04* (2013.01); *F16D 2121/12* (2013.01)

(56) References Cited

U.S. PATENT DOCUMENTS

| | | | |
|---|---|---|---|
| 6,336,323 B1* | 1/2002 | Tanabe | B60T 11/10 |
| | | | 92/28 |
| 8,662,259 B2* | 3/2014 | Vidal | F16D 59/02 |
| | | | 188/170 |
| 10,364,792 B2* | 7/2019 | Engrand | F04B 1/0404 |
| 11,136,976 B2* | 10/2021 | Gerlach | F04C 15/0084 |
| 2006/0249338 A1 | 11/2006 | Daigre | |
| 2011/0253488 A1 | 10/2011 | Vidal et al. | |
| 2022/0170460 A1* | 6/2022 | O Hara | F16D 59/02 |
| 2023/0150458 A1* | 5/2023 | Davis | F16D 55/24 |
| | | | 188/71.5 |
| 2023/0175496 A1* | 6/2023 | Engrand | F03C 1/047 |
| | | | 92/12.1 |

* cited by examiner

BRAKING DEVICE

CROSS-REFERENCE TO RELATED APPLICATIONS

This application is the United States national phase of International Application No. PCT/FR2019/050997 filed Apr. 29, 2019, and claims priority to French Patent Application No. 1800401 filed May 2, 2018, the disclosures of which are hereby incorporated by reference in their entirety.

BACKGROUND OF THE INVENTION

Field of the Invention

The present disclosure relates to the hydraulic machines, and more particularly to the braking devices for hydraulic machines.

State of the Prior Art

The braking devices for hydraulic machines are known comprising a stack of disks connected to two elements assembled in relative rotation, for example the relative rotation between a shaft and a casing, as well as actuators aiming at exerting or releasing an application force on the stack of disks.

Document FR 2958986 in the name of the applicant thus presents an example of a braking device for a hydraulic machine having a force multiplication effect. However, the known systems tend not to achieve a sufficiently homogeneous distribution of the brake application force, which in some conditions leads to the generation of too large torque.

The present disclosure thus aims at addressing at least partially this problem.

SUMMARY OF THE INVENTION

To this end, the present disclosure relates to a braking device comprising:
- a brake casing assembled in relative rotation with respect to a shaft along an axis of rotation,
- first braking elements, secured in rotation to the shaft,
- second braking elements secured in rotation to the brake casing, adapted to cooperate with the first braking elements, the first braking elements and the second braking elements forming a stack,
- an elastic return element, assembled to bear on the casing and configured so as to exert an application force on the first and second braking elements along an application direction,
- a brake release actuator, adapted to bias the elastic return element along a direction opposing the application direction,
- characterized in that the braking device comprises a diffusion wedge and a pressure wedge positioned respectively to bear against the stack and against the elastic return element,
- the diffusion wedge and the pressure wedge having contact surfaces defining an annular linear contact about the axis of rotation.

According to one example, one among the diffusion wedge and the pressure wedge has a contact surface inclined at an angle $\beta$ with respect to the axis of rotation, the angle $\beta$ being comprised between 30° and 60°, and the other among the diffusion wedge and the pressure wedge has a curved contact surface so as to form the annular linear contact about the axis of rotation.

The angle $\beta$ is then typically comprised between 40° and 50°, or even equal to 45°.

According to one example, the diffusion wedge and the pressure wedge have guide surfaces cooperating so as to index the diffusion wedge and the pressure wedge along the axis of rotation.

The diffusion wedge then typically has a guide portion comprising an outer face cylindrical of revolution about the axis of rotation, and in which the pressure wedge has an indexing portion comprising an inner face cylindrical of revolution about of the axis of rotation, the outer face of the pressure wedge being configured so as to be tightly assembled around the guide portion of the diffusion wedge.

The present disclosure also relates to a hydraulic machine comprising a braking device as defined above.

According to one example, the hydraulic machine comprises a cylinder block having a plurality of housings extending radially about the axis of rotation, and in which pistons slide, as well as a multi-lobe cam disposed around the cylinder block and a distributor.

According to one example, the relative rotation of the shaft with respect to the casing is ensured by two rolling elements, and in which the braking device is positioned between the two rolling elements.

As a variant, the relative rotation of the shaft with respect to the casing is ensured by two rolling elements, and in which the braking device is positioned at one end of the hydraulic machine along the axis of rotation, so that the rolling elements are positioned between the braking device on the one hand, and the cylinder block and the distributor on the other hand.

According to another variant, the relative rotation of the shaft with respect to the casing is ensured by two rolling elements, and in which the braking device is positioned at one end of the hydraulic machine along the axis of rotation, so that the cylinder block and the distributor are positioned between the rolling elements and the braking device.

BRIEF DESCRIPTION OF THE DRAWINGS

The invention and its advantages will be better understood upon reading the detailed description given below of various embodiments of the invention given by way of non-limiting examples. This description refers to the pages of appended figures, on which.

In all of the figures, the elements in common are identified by identical numeric references.

DETAILED DESCRIPTION OF THE INVENTION

Figure 1:
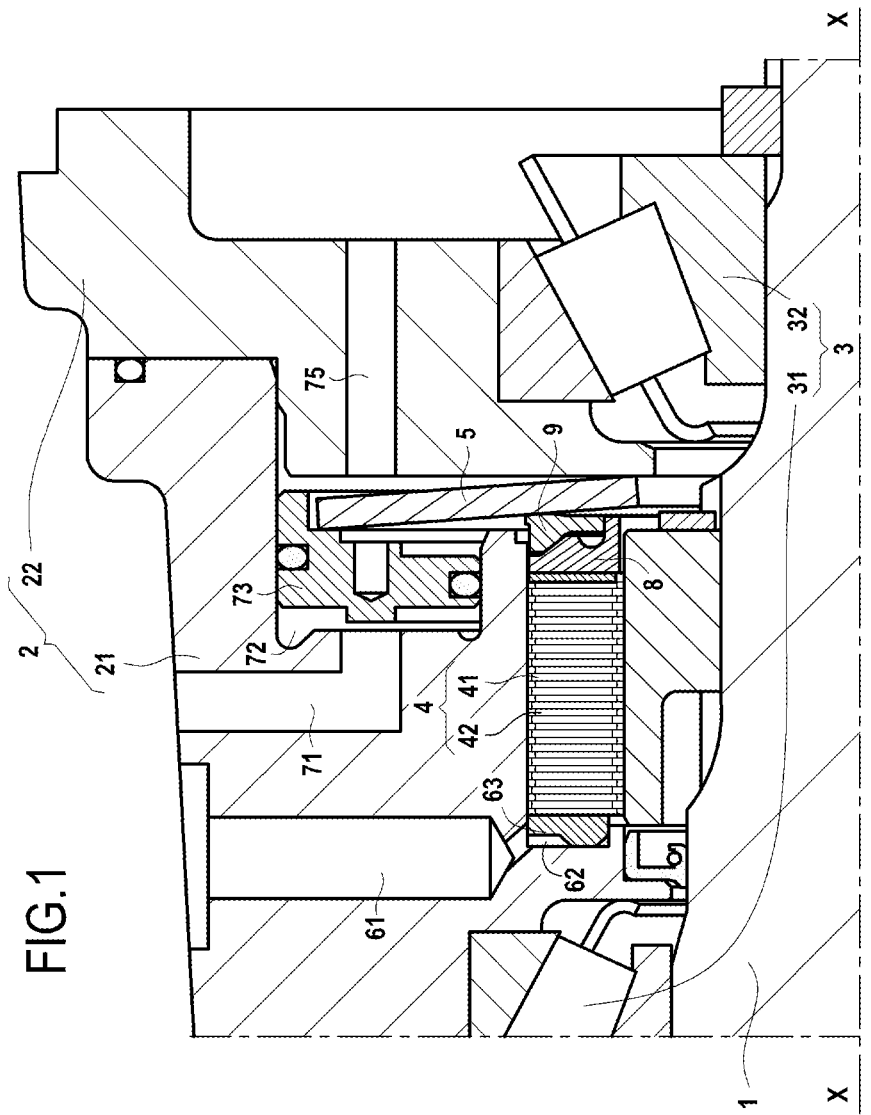
FIG. 1 represents a sectional view of an example of a braking device according to one aspect of the present disclosure.

FIG. 1 presents an example of a braking device as proposed.

The braking device is configured so as to allow slowing down or releasing a relative rotational movement between a shaft 1 and a casing 2 about an axis of rotation X-X.

In the represented example, the relative rotation between the shaft 1 and the casing 2 is ensured by rolling elements 3, comprising here two tapered roller bearings 31 and 32, the braking device being here interposed between these two bearings 31 and 32. It is however understood that this example is only illustrative and that the braking device can be freely placed with respect to the rolling elements 3, the latter also being able to be of any type as long as they ensure a movement in relative rotation between the shaft 1 and the casing 2.

In the case of an application of such a braking device for a hydraulic machine, the braking device can for example be disposed at one end of the hydraulic machine, for example at the level of the distributor of the hydraulic machine, and not at the level of the rolling elements.

The braking device as represented comprises a brake casing, here coincident with the casing 2, composed of two casing segments 21 and 22, making it possible to define chambers and ducts as will be seen below.

The braking device also comprises a plurality of braking means, typically braking disks. More specifically, the braking device here comprises first braking elements 41 secured in rotation to the shaft 1, directly or by an intermediate part connected to the shaft as represented in FIG. 1, and second braking elements 42 secured in rotation to the casing 2, the first and second braking elements 41 and 42 thus forming a stack 4 of braking disks extending along the direction defined by the axis of rotation X-X.

In a known manner, the first and second braking elements 41 and 42 are configured to selectively come into contact with each other and thus slow down the relative rotational movement between the shaft 1 and the casing 2 due to the friction between the first and second braking elements 41 and 42, or to be disengaged in order to release this rotational movement. Typically, these braking elements 41 and 42 are positioned in an enclosure full of oil.

An elastic element 5, here a spring washer, is assembled to bear against the casing 2 (here the casing segment 22) so as to exert an application force on the stack 4, so that by default, the braking device is in a braking configuration.

The device as presented further comprises a braking supply duct 61 arranged in the casing 2, connected to a braking chamber 62 in which a braking piston 63 is positioned, configured to exert an application force on the stack 4. The braking piston 63 here performs a dynamic brake function, and therefore applies a positive braking force based on a command. As a variant, this assembly can form a brake having only a static brake role; the braking piston 63 forms a fixed abutment for the stack 4 of braking disks, and the braking supply duct 61 forms a channel for draining or discharging an oil flow sweeping the brake. The static brake function is performed by the elastic element 5.

The braking device as represented in FIG. 1 is commonly referred to as a "combined" brake, which can perform both the parking brake and dynamic brake functions. Indeed, when the vehicle is stationary, the pressure is zero in the chambers 62 and 72; the elastic element 5 then ensures an application of the stack 4, performing a parking brake function. In operation, a pressure is applied within the brake release chamber 72, so as to release the pressure force applied by the elastic element 5 on the stack 4, and therefore release the parking brake. The dynamic braking function is for its part performed by applying a pressure within the braking chamber 62. As a variant, the braking piston 63 as well as the braking chamber 62 and the braking supply duct 61 are deleted, and the dynamic braking is performed by other braking means not represented, or by hydrostatic braking.

The device also comprises a brake release piston 73 positioned in a brake release chamber 72, supplied by a brake release duct 71 formed in the casing 2. The brake release piston 73 is movably assembled so as to exert a compressive force on the elastic element 5 tending to counteract the application force it exerts on the stack 4, and therefore making it possible to disengage the braking elements 41 and 42 from the stack 4 by reducing or eliminating the application force exerted onto the stack 4 by the elastic element 5. A drain channel 75 is arranged in the casing element 22, allowing relieving the pressure within the volume in which the elastic element 5 is disposed.

Figure 2:
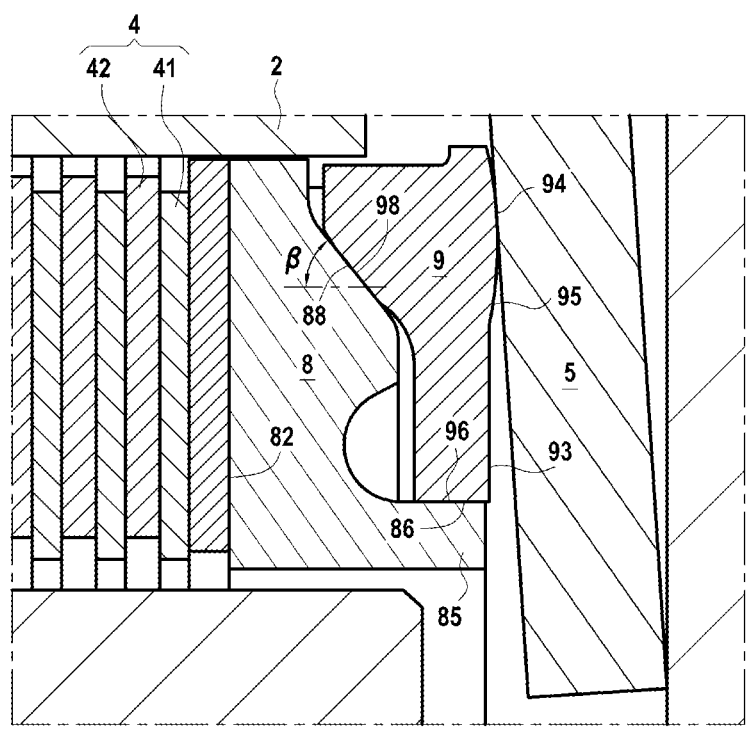
FIG. 2 is a detailed view of an area of FIG. 1.

In the device as presented, the contact between the elastic element 5 and the stack 4 is made by means of a diffusion wedge 8 and of a pressure wedge 9 described below. FIG. 2 presents a detailed view of these elements.

The diffusion wedge 8 has the general shape of a ring about the axis of rotation X-X. In the example represented, the diffusion wedge has an outer periphery defining a surface of contact with the casing 2, so that the diffusion wedge 8 is slidably assembled along the axis X-X with respect to the casing 2.

The diffusion wedge 8 is positioned to bear against the stack 4 via a proximal face 82. This proximal face is typically planar, so as to exert a planar bearing along an annular contact surface about the axis of rotation X-X on the stack 4.

The pressure wedge 9 is assembled to bear against the diffusion wedge 8 on the one hand, and against the elastic element 5 on the other hand.

In the example represented, the pressure wedge 9 is bearing against the elastic element 5 via a distal face 93. This distal face typically has a convex curved portion 94 having a high radius of curvature, so as to ensure good transmission of the forces between the elastic element 5 and the pressure wedge 9.

The pressure wedge 9 is typically tightly assembled with respect to the diffusion wedge 8. More specifically, the pressure wedge 9 and the diffusion wedge 8 are assembled with respect to each other with a tight fit, so as to prevent any relative movement of one with respect to the other. This fit is made here by means of guide portions described below. The diffusion wedge 8 comprises a guide portion 85 extending along the axis X-X, having an outer face 86 cylindrical of revolution about the axis X-X. The pressure wedge 9 has for its part an inner face 96 cylindrical of revolution about the axis X-X defining a guide portion, and is tightly assembled around the guide portion 85 of the diffusion wedge 8. Such guide portions allow in particular achieving a tight assembly while ensuring coaxiality of the diffusion wedge 8 and of the pressure wedge 9. This tight assembly also allows facilitating the assembly of the entire braking device in a hydraulic machine.

Alternatively, the pressure wedge 9 can be movably assembled in translation along the axis X-X. The guide portion 85 of the diffusion wedge and the inner face 96 of the pressure wedge 9 then allow a sliding along the axis X-X, and perform an indexing of the relative inclination of the diffusion wedge 8 and of the pressure wedge 9 with respect to the axis X-X. The inner face 96 of the pressure wedge 9 then typically has a diameter very slightly greater than the diameter of the outer face 86 of the guide portion 85 of the diffusion wedge 8, in order to define a sliding contact in translation along the axis X-X. The indexing portions of the diffusion wedge 8 and of the pressure wedge 9 thus allow avoiding an unwanted inclination with respect to the axis X-X of these two wedges 8 and 9 with respect to each other. The holding of the diffusion wedge 8 and of the pressure wedge 9 in axial contact is ensured by the pressure force exerted by the washer 5. The length of the guide portion 85 is such that the pressure wedge 9 can be axially housed almost entirely around the guide portion 85, which makes it possible to obtain a compactness of the system.

The pressure wedge 9 and the diffusion wedge 8 are in contact along the axial direction via two contact surfaces, respectively 98 and 88. The contact surface 88 of the diffusion wedge 8 and the contact surface 98 of the pressure wedge 9 define an annular linear contact about the axis of rotation X-X.

More specifically, the contact surface 88 of the diffusion wedge 8 forms typically a truncated cone of angle β with respect to the axis of rotation X-X, the angle β being comprised between 30° and 60°, or more specifically between 40° and 50°, or even more specifically equal to 45°. The contact surface 98 of the pressure wedge 9 has for its part a slight curvature, so as to be slightly domed. The contact between the domed contact surface 98 and the planar contact surface 88 is therefore of the annular linear type about the axis of rotation X-X. As a variant, the contact surface 88 may be domed, and the contact surface 98 planar, the annular linear bearing about the axis of rotation X-X then being ensured.

Such a configuration has several advantages over the known assemblies.

Indeed, in the known assemblies, the transmission of forces between the washer 5 and the stack 4 is commonly achieved by means of a one-piece wedge positioned at the outer periphery of the stack 4. However, the applicant has found that such a configuration leads to a concentration of the forces in the stack 4, and can lead to edge effects.

The braking device as proposed allows overcoming these effects. Indeed, the linear bearing between the contact surface 88 of the diffusion wedge 8 and the contact surface 98 of the pressure wedge 9 allows optimizing the distribution of the force exerted by the pressure wedge 9 on the diffusion wedge 8, and thus distributing it over the entire surface of contact with the stack 4.

Furthermore, the inclination of angle β of the planar contact surface 88 (or alternatively of the contact surface 98) between the diffusion wedge 8 and the pressure wedge 9 allows reducing the bending moment in the pressure wedge 9 and increasing the diffusion length of the force in the diffusion wedge 8 prior to the transmission of this force to the stack 4.

The pressure wedge 9 can be deformed under the pressure force, mainly the bending force, while the diffusion wedge 8 is made so as to be more massive, so as to have less deformation and thus allow transmitting the force. Such a configuration also has limited axial and radial space requirement. Furthermore, the proposed structure ensuring an annular linear contact between the pressure wedge 8 and the diffusion wedge 9 makes it possible to maintain the same contact whatever the force and the deformation to which the pressure wedge 8 is subjected.

The applicant was thus able to observe that the edge effects are eliminated, and that the proposed system allows obtaining a better homogenization of the forces transmitted to the stack 4, in particular when the pressing force is eccentric with respect to the mean radius of the stack 4.

The contact pressure in the stack 4 is thus better distributed over the entire radius of the stack 4, and the local overpressure phenomena are greatly reduced. By way of comparison, the modification of the structure of the wedge allows reducing, for the same system, the maximum contact pressure in the stack 4 from 42 MPa to 29 MPa, the other elements of the system remaining unchanged.

Advantageously, the curved portion 94 is not located at the level of the mean radius of the stack 4. There is thus a radial offset between the contact between the washer 5 and the curved portion 94, corresponding to the point of application of the pressing force, and the annular linear contact between the contact surface 88 of the diffusion wedge 8 and the contact surface 98 and of the pressure wedge 9.

Advantageously, the normal to the inclined plane of angle β at the point of contact between the pressure wedge 9 and the diffusion wedge 8 intersects or approaches the mean radius of the stack 4 at the level of the interface between the stack 4 and the diffusion wedge 8, which allows improving the distribution of the forces within the stack 4.

The braking device as presented finds application in particular for a hydraulic machine such as a hydraulic pump or a hydraulic motor, which may be of the type with axial pistons or radial pistons and multilobe cam. The hydraulic machine can be a hydraulic machine with a rotating shaft and stationary casing, or with a stationary shaft and rotating casing.

Figure 3:
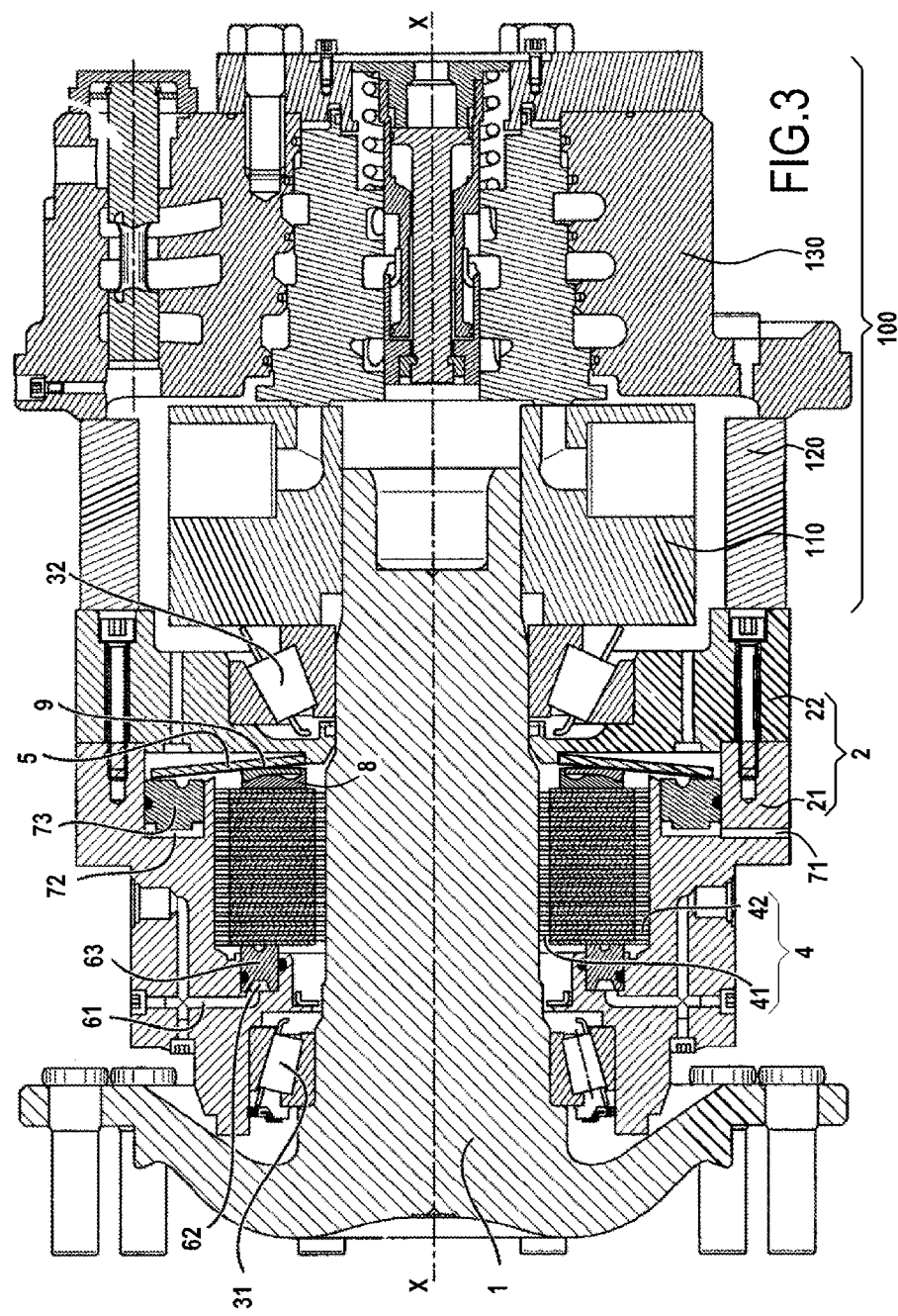
FIG. 3 presents an example of application of such a braking device for a hydraulic machine.

FIG. 3 presents an example of application of such a braking device for a hydraulic machine with radial pistons, here forming a vehicle wheel spindle.

FIG. 3 thus represents a hydraulic machine with radial pistons 100 comprising a shaft 1, a cylinder block 110 having a plurality of housings in which pistons are slidably assembled and around which a multilobe cam 120 is positioned, and a distributor 130 here positioned at one end of the shaft 1 and ensuring fluid distribution in the housings of cylinder block 110. The operation of such a hydraulic machine is well known and will not be described in detail here. The braking device is here again positioned between the rolling elements 31 and 32. It is however understood that the location of the braking device can be changed; the hydraulic machine 100 can be positioned between the rolling elements, and the braking device can then be positioned at one end of the shaft 1. As a variant, the hydraulic machine 100 as well as the braking device can be disposed between the rolling elements 3, or alternatively, the hydraulic machine 100 as well as the braking device can be disposed on either side or on the same side with respect to the rolling elements 3, the braking device being for example able to be positioned in the extension of the hydraulic machine 100 with respect to the axis of rotation X-X.

It is also noted here that the first braking elements 41 are here directly assembled around the shaft 1, unlike the embodiment represented above in which an intermediate part ensures the connection between the first braking elements 41 and the shaft 1.

The braking device as presented can perform a parking brake function for a vehicle, a service brake, an emergency brake valve or even a combined service brake and parking brake function.

Although the present invention has been described with reference to specific exemplary embodiments, it is obvious that modifications and changes can be made to these examples without departing from the general scope of the invention as defined herein. Particularly, individual characteristics of the different illustrated/mentioned embodiments can be combined in additional embodiments. Consequently, the description and the drawings should be considered in an illustrative rather than a restrictive sense.

It is also obvious that all the characteristics described with reference to a method can be transposed, alone or in combination, to a device, and conversely, all the characteristics described with reference to a device can be transposed, alone or in combination, to a method.

The invention claimed is:

1. A braking device comprising:
    a brake casing assembled in relative rotation with respect to a shaft along an axis of rotation;
    first braking elements, secured in rotation to the shaft;
    second braking elements secured in rotation to the brake casing, the second braking elements adapted to cooperate with the first braking elements, the first braking elements and the second braking elements forming a stack;
    an elastic return element assembled to bear on the casing and configured so as to exert an application force on the first and second braking elements along an application direction; and
    a brake release actuator adapted to bias the elastic return element along a direction opposing the application direction;
    wherein the braking device comprises a diffusion wedge and a pressure wedge positioned respectively to bear against the stack and against the elastic return element, and
    wherein the diffusion wedge and the pressure wedge have contact surfaces defining an annular linear contact about the axis of rotation.

2. The braking device according to claim 1, wherein at least one of the diffusion wedge and the pressure wedge has a contact surface inclined at an angle with respect to the axis of rotation, the angle being comprised between 30° and 60°, and the other of the diffusion wedge and the pressure wedge has a curved contact surface so as to form the annular linear contact about the axis of rotation.

3. The braking device according to claim 2, wherein the angle comprised between 40° and 50°.

4. The braking device according to claim 3, wherein the angle is equal to 45°.

5. The braking device according to claim 1, wherein the diffusion wedge and the pressure wedge have guide surfaces cooperating so as to index the diffusion wedge and the pressure wedge along the axis of rotation.

6. The braking device according to claim 5, wherein the diffusion wedge has a guide portion comprising an outer face cylindrical of revolution about the axis of rotation, and wherein the pressure wedge has an indexing portion comprising an inner face cylindrical of revolution about the axis of rotation, an outer face of the pressure wedge being configured so as to be tightly assembled around the guide portion of the diffusion wedge.

7. A hydraulic machine comprising a braking device according to claim 1.

8. The hydraulic machine according to claim 7, comprising a cylinder block having a plurality of housings extending radially about the axis of rotation, and in which pistons slide, as well as a multi-lobe cam disposed around the cylinder block and a distributor.

9. The hydraulic machine according to claim 7, wherein two rolling elements are configured to ensure the relative rotation of the shaft with respect to the casing, and wherein the braking device is positioned between the two rolling elements.

10. The hydraulic machine according to claim , wherein two rolling elements are configured to ensure the relative rotation of the shaft with respect to the casing, and wherein the braking device is positioned at one end of the hydraulic machine along the axis of rotation, so that the rolling elements are positioned between the braking device and the cylinder block and the distributor.

11. The hydraulic machine according to claim 7, wherein two rolling elements are configured to ensure the relative rotation of the shaft with respect to the casing, and wherein the braking device is positioned at one end of the hydraulic machine along the axis of rotation, so that the cylinder block and the distributor are positioned between the rolling elements and the braking device.

12. The braking device according to claim 2, wherein the diffusion wedge and the pressure wedge have guide surfaces cooperating so as to index the diffusion wedge and the pressure wedge along the axis of rotation.

13. The braking device according to claim 3, wherein the diffusion wedge and the pressure wedge have guide surfaces cooperating so as to index the diffusion wedge and the pressure wedge along the axis of rotation.

14. The braking device according to claim 4, wherein the diffusion wedge and the pressure wedge have guide surfaces cooperating so as to index the diffusion wedge and the pressure wedge along the axis of rotation.

15. The hydraulic machine according to claim 8, wherein two rolling elements are configured to ensure the relative rotation of the shaft with respect to the casing, and wherein the braking device is positioned between the two rolling elements.

16. The hydraulic machine according to claim 8, wherein two rolling elements are configured to ensure the relative rotation of the shaft with respect to the casing, and wherein the braking device is positioned at one end of the hydraulic machine along the axis of rotation, so that the rolling elements are positioned between the braking device and the cylinder block and the distributor.

17. The hydraulic machine according to claim 8, wherein two rolling elements are configured to ensure the relative rotation of the shaft with respect to the casing, and wherein the braking device is positioned at one end of the hydraulic machine along the axis of rotation, so that the cylinder block and the distributor are positioned between the rolling elements and the braking device.

18. A hydraulic machine comprising a braking device according to claim 2.

19. A hydraulic machine comprising a braking device according to claim 3.

20. A hydraulic machine comprising a braking device according to claim 4.

* * * * *

UNITED STATES PATENT AND TRADEMARK OFFICE
CERTIFICATE OF CORRECTION

| | | |
|---|---|---|
| PATENT NO. | : 11,788,591 B2 | Page 1 of 1 |
| APPLICATION NO. | : 17/051819 | |
| DATED | : October 17, 2023 | |
| INVENTOR(S) | : Gilles Grillon et al. | |

It is certified that error appears in the above-identified patent and that said Letters Patent is hereby corrected as shown below:

On the Title Page

Item [57], Line 8, delete "a may" and insert -- may --

In the Claims

Column 7, Line 33, Claim 3, delete "angle" and insert -- angle is --

Column 8, Line 4, Claim 10, delete "claim ," and insert -- claim 7, --

Signed and Sealed this
Twenty-sixth Day of December, 2023

*Katherine Kelly Vidal*

Katherine Kelly Vidal
*Director of the United States Patent and Trademark Office*